(No Model.)
W. R. PATTERSON.
SPLICE FOR UNDERGROUND TELEGRAPH CABLES.
No. 330,049. Patented Nov. 10, 1885.
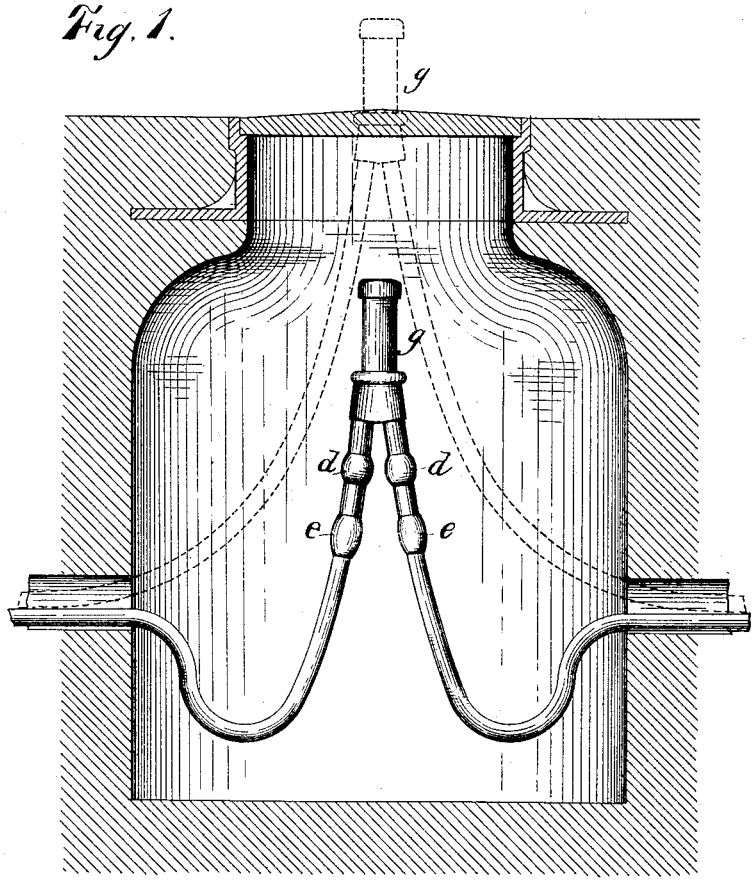
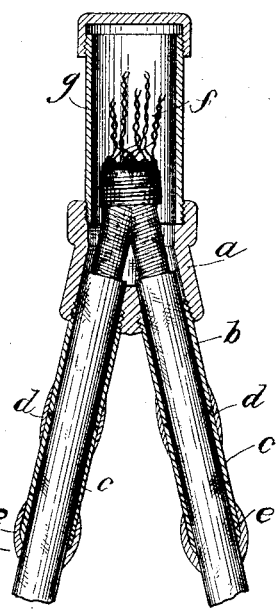
Witnesses.
Sam'l B. Dover.
F. H. McCulloch.
Inventor.
William R. Patterson,
By George P. Barton
Attorney.

UNITED STATES PATENT OFFICE.

WILLIAM R. PATTERSON, OF CHICAGO, ILLINOIS, ASSIGNOR TO THE WESTERN ELECTRIC COMPANY, OF SAME PLACE.

SPLICE FOR UNDERGROUND TELEGRAPH-CABLES.

SPECIFICATION forming part of Letters Patent No. 330,049, dated November 10, 1885.

Application filed June 16, 1885. Serial No. 168,909. (No model.)

*To all whom it may concern:*

Be it known that I, WILLIAM R. PATTERSON, a citizen of the United States, residing at Chicago, in the county of Cook and State of Illinois, have invented a certain new and useful Improvement in Splices for Underground Telegraph-Cables, of which the following is a full, clear, concise, and exact description, reference being had to the accompanying drawings, forming a part of this specification.

My invention relates to underground telegraph-cables; and it consists in providing a Y-joint at the man-hole of the conduit in which the cable is placed, and in providing sufficient slack in the cable so that the repairer may lift the joint to the surface and make such repairs, tests, and connections as may be necessary, thus obviating the necessity of making the man-holes large enough to permit the repairer to work therein with tongs and other tools which are required.

My invention is illustrated in the accompanying drawings, in which Figure 1 is a sectional view of a man-hole, showing the terminal of the cable therein, the cable being of sufficient length to permit the joint to be lifted above the man-hole, as indicated by the dotted lines. Fig. 2 is a sectional view of the joint.

In my Patent No. 277,335, of May 8, 1883, I have shown a splice for telegraph-cables, in which a T-piece is used to join the ends of the pipes of the sections of cable to be joined. A similar T-piece could not be used where it is necessary to lift the joint to the surface of the ground, as herein described. I therefore provide the Y-coupling *a*. The brass sleeves *b* are screwed into this Y-coupling or casting *a*, as shown. The lead sleeves *c* are united with the brass sleeves *b* by means of the wiped joints *d*. The lead sleeves are further secured to the lead pipe of the sections of cable to be joined by the wiped joints *e*. The ends of the different conductors to be joined are laid bare and twisted together, as shown at *f*. After thus being united the splices of the different circuits may be insulated by glass tubes. I then place over the ends of the wires thus united the cap *g*, which is screwed into the Y-piece *a*, as shown.

As shown, it will be seen that the different sections of the cable are bent downwardly, so that there may be sufficient slack to permit the repairer to lift the joint to the top of the man-hole.

Having thus described my invention, I claim as new and desire to secure by Letters Patent—

1. The combination, in a man-hole of an underground conduit for telegraph-cables, of two sections of cable united by a Y-coupling or splice, said sections being bent or coiled at said man-hole, as described, whereby the joint may be raised to the surface of the ground for repairs and testing, substantially as and for the purpose specified.

2. The combination, with the Y-piece *a*, of the brass sleeves *b*, screwed therein, the lead sleeves *c*, the wipe-joints, and the cap *g*, whereby the ends of the sections of the lead pipe are united and the conductors protected, substantially as and for the purpose specified.

In witness whereof I hereunto subscribe my name this 13th day of June, A. D. 1885.

WILLIAM R. PATTERSON.

Witnesses:
 GEORGE P. BARTON,
 F. H. McCULLOCH.